United States Patent [19]

Nioh et al.

[11] 4,353,709
[45] Oct. 12, 1982

[54] GRANULATION PROCESS

[75] Inventors: Susumu Nioh, Tokyo; Hiroshi Hirayama; Tetsuzo Honda, both of Funabashi; Takashi Nagahama; Masaki Naruo, both of Mobara, all of Japan

[73] Assignees: Mitsui Toatsu Chemicals, Incorporated; Toyo Engineering Corporation, both of Japan

[21] Appl. No.: 207,928

[22] Filed: Nov. 18, 1980

[30] Foreign Application Priority Data

Nov. 28, 1979 [JP] Japan .................................. 54-152985

[51] Int. Cl.³ .......................... A01N 25/06; B01J 2/04; B01J 2/16
[52] U.S. Cl. .................................... 23/313 FB; 34/10; 34/20; 71/64.02; 71/64.06; 264/7; 264/12; 264/14; 427/213; 427/214
[58] Field of Search .................... 23/313 FB; 422/140, 422/143; 427/213, 214; 118/DIG. 5; 34/10, 13, 20, 57 A; 71/64.02, 64.06, 64.07; 159/47 VA, DIG. 3; 264/7, 11, 12, 14

[56] References Cited

U.S. PATENT DOCUMENTS

| | | | |
|---|---|---|---|
| 2,986,475 | 5/1961 | Mesnard et al. | 427/213 |
| 3,231,413 | 5/1966 | Berquin et al. | 117/100 |
| 3,457,336 | 7/1969 | Harris | 71/64.06 |
| 3,539,326 | 11/1970 | Otsuka et al. | 71/64.07 |
| 3,933,956 | 1/1976 | Mavrovic | 264/14 |
| 4,190,622 | 2/1980 | Landis | 71/64.07 |
| 4,213,938 | 7/1980 | Pyzel | 422/143 |
| 4,217,127 | 8/1980 | Kono et al. | 427/213 |
| 4,219,589 | 3/1980 | Niks et al. | 427/213 |
| 4,226,830 | 10/1980 | Davis | 422/143 |

Primary Examiner—Bradley Garris
Attorney, Agent, or Firm—McGlew and Tuttle

[57] ABSTRACT

There is disclosed a process of granulation comprising dropping as liquid droplets the melt of a substance solidifiable by cooling or drying through a zone having a sufficient vertical distance to allow solidification of the droplets, forming a fluidized bed of the solidified droplets on the bottom of the said zone, spraying the same or a different melt from the above mentioned substance as fine liquid grains along with a gas stream into the fluidized bed thereby forming a spouted bed of the solidified droplets in the fluidized bed, coating and enlarging the solidified droplets with the fine liquid grains inside the spouted bed, and discharging the obtained large sized granules from the fluidized bed. There is also disclosed an apparatus for practicing the process.

4 Claims, 3 Drawing Figures

GRANULATION PROCESS

BACKGROUND OF THE INVENTION

1. Field of the Invention

The present invention generally concerns a process of granulation and an apparatus therefor, and more particularly it concerns an improved process of granulation for obtaining comparatively large granules and apparatus therefor.

2. Description of the Prior Art

There are known in the art apparatus with a large capacity for mass-producing small sized granules and capable of manufacturing high quality products with a single unit. For instance, in the prilling system used in granulation of urea, etc., one unit has a capacity as large as 2,000 t/day or more. However, it is impossible with such an apparatus to increase the granule diameter of the product beyond a certain limit because of the physical properties of the melt to be granulated.

The reason for this is because, if the diameter of the nozzle for the melt is increased, the melt flows continuously and the liquid drops cannot be formed. If the liquid drops become larger, on the other hand, the vertically falling distance of the liquid drops required for solidification becomes excessive. According to the prilling process, the average diameter of ca. 2 mm is the limit for granular urea.

There are known in the art granulation apparatus for large diameter granules and these are of the rolling type, compression molding type, casting type, or mechnical processing type. These are however not suitable for mass production.

In the case of apparatus for manufacturing large diameter granules, the quantity of the substance which is necessary to make up the granules is from several times to several hundred times greater than that for making small diameter granules, and generally the granule particle size distribution is broad in such apparatus. Therefore, technologically speaking it is particularly more difficult to obtain products with uniform particle size and shape which have a large diameter than product with a smaller diameter.

Accordingly, in the above-mentioned conventional granulation apparatus, the maximum production per unit apparatus is as small as 500 t/day although the costs for the facilities and the operation are unchangeably high.

There are sometimes demands for products with granule diameter of more than 2 mm for convenience in use, handling or storage, and there are also demands for a method and apparatus which facilitate production of large sized granular products of an arbitrary diameter in large quantities and at less cost in order to meet the need of mixing small sized and large sized granules in a suitable ratio to increase the bagged amount per unit volume and to facilitate handling during use. This will be most convenient for storage, transportation and use of granule products of the same or the different quality.

SUMMARY OF THE INVENTION

An object of the present invention is to provide an improved granulation process which enables efficient production on a mass industrial scale of large diameter granule products having a substantially spherical-shape like pearls and an apparatus therefor.

Another object of the present invention is to provide a granulation apparatus which can effectively combine the prilling system the capacity of which may be increased but which cannot manufacture the large diameter products, and the spouted bed granulation system the capacity of which cannot be increased but which can manufacture large diameter granules.

According to the present invention there is provided the following granulation process:

A process for manufacturing large diameter granular products comprising the steps of dropping as liquid droplets the melt of a substance solidifiable by cooling or drying through a zone having a sufficient vertical distance for solidifying the said liquid droplets by the countercurrent contact with a gas stream for cooling or drying the said drops, fluidizing the thus solidified droplets also known as prills at the bottom of the said zone with a gas stream to form a fluidized bed, spraying the melt of a substance solidifiable by cooling or drying into the said fluidized bed as fine liquid grains along with a gas stream thereby forming a spouted bed of the said solidified droplets in fluidized bed, coating and enlarging the said solidified droplets with the said fine grains in the said spouted streams to form granules of a large diameter, and then discharging the said large diameter granules from the fluidized bed.

There is also provided the following apparatus for conducting the above-described granulation process:

A granulation apparatus comprising a cylindrical member positioned vertically for providing a sufficient space for the liquid droplets of a substance solidifiable by cooling or drying which droplets fall through the inside of the cylinder to become solidified by being cooled or dried; exhaust means provided at the top of the said cylindrical member; droplet supply means provided at the top of the said cylindrical member for discharging the liquid droplets of the substance solidifiable by cooling or drying into a rising gas stream inside the said cylindrical member; a perforated plate for the fluidized bed provided at the bottom of the said cylindrical member; spray nozzle means opening on the same plane as the surface of said perforated plate, or at a position below or above the said perforated plate for discharging the fine liquid grains of the substance solidifiable by cooling or drying, supply means for a gas stream to form the spouted bed of the said solidified drops in the fluidized bed centering the said spraying nozzle means; supply means for a gas stream below the said perforated plate for forming the fluidized bed over the said perforated plate, and means for discharging granules from the said fluidized bed.

DETAILED DESCRIPTION OF THE INVENTION

Figure 1A:
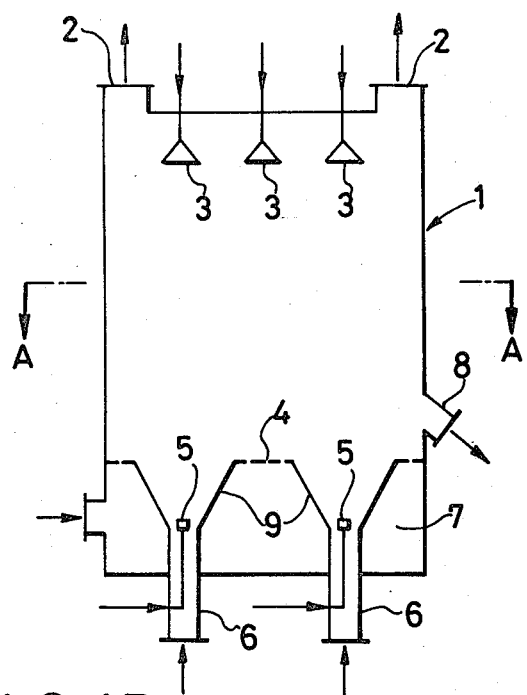
FIG. 1(A) is a vertical cross-sectional view showing one embodiment of the present invention apparatus.

In the prilling system, the melt of the substance solidifiable by cooling or drying is pressed downward through the nozzles to naturally drop through the cooling medium and becomes granules while falling and while being cooled or dried. As mentioned above, even if the diameter of the nozzle is increased in size, the physical properties of the substance being processed may be such that the melt flows out in a continuous flow and does not become spherical, or the cooling effect is excessively hindered due to the decrease in the specific surface area. Thus, it is impossible to obtain granules with the desired large diameters. However, as far as the manufacture of granules having a diameter less than the specified size is concerned, the capacity of the system may easily be increased by increasing the number of holes in the nozzle to enlarge the horizontal cross-section of the space for dropping the drops.

Furthermore, with the prilling system the fine grains of the substance solidifiable by cooling or drying become adhered to the granules as they are spouted inside the grain layer being circulated within the said system or inside the spouted bed formed inside the fluidized bed, the said granules being passed repeatedly through the spouted bed and becoming solidified, thus forming large diameter granules. In order for the fine seed granules, nuclei for large diameter granules, to grow into the granules of a desired diameter, it is necessary to provide a certain operational time parameter. As the number of times they pass through the spouted bed varies depending on the individual grains, the grain size distribution of the granules formed becomes non-uniform, and there are many granules which do not grow sufficiently to reach the desired diameter range. Thus, it is extremely difficult to improve the capacity and the efficiency of the process. Moreover, the spouted bed is limited in its size for supporting the bed itself and for smooth supply and passage of the grains which pass therethrough repeatedly.

In the present invention, the above mentioned two types of granulation systems are combined. Surprisingly, it was found that this combination facilitates the manufacture of large sized granules with just a single apparatus unit by synergistically exploiting the advantages of the two systems and by removing the disadvantages thereof.

As the granule product of the prilling system has a narrow particle size distribution range and can be used as seed grains the efficiency of the granulation is remarkably increased when the grains are used as the seed grains for the spouted bed type granulation system.

In the present invention process, various solid substances are used as substances solidifiable by cooling or drying. Various types of fertilizers such as urea, ammonium nitrate, and mixtures of these substances with ammonium phosphate or potassium chloride are particularly applicable. Such substances in other words may be both dropped as liquid droplets through the zone, and/or they may be sprayed as fine liquid grains from the bottom of the zone. The melt of these materials includes a substantially anhydrous melt, a hot aqueous solution and a slurry. A melt solution may contain up to 40 weight % of water, and its temperature is generally 80°–170° C.

Various gas streams may be used both for fluidizing the solidified droplets at the bottom of the zone and for spraying the melt from the bottom of the zone and forming the spouted bed of the solidified droplets. The choice of gas stream depends on the purpose intended, but generally atmospheric air is used. The temperature of the air stream is generally set within the range of 0°–150° C.

The zone through which the droplets of the melt fall and solidify varies depending on the type of substance to be used, but usually it is suitably selected within the range of 10 m to 70 m.

The ratio of the melt dropped as droplets to the melt sprayed as fine grains is set to be between 1:4 and 4:1.

Other substances to be added in the product granules may be fine grains supplied to the fluidized bed or mixed in the melt.

If there is a need for obtaining a product of a uniform grain diameter, the granules formed may be classified, and those smaller than the desired diameter are left as they are while those with a larger diameter than that desired are suitably pulverized and returned to the fluidized bed.

The grain diameter of the solidified droplets is preferably below 2 mm, and more particularly it is preferred to be 1 to 2 mm. The diameter of the drops which have become enlarged and solidified as the fine grains of the sprayed melt have adhered thereto and solidified is preferred to be 1 to 5 times greater than the original diameter.

Figure 1B:
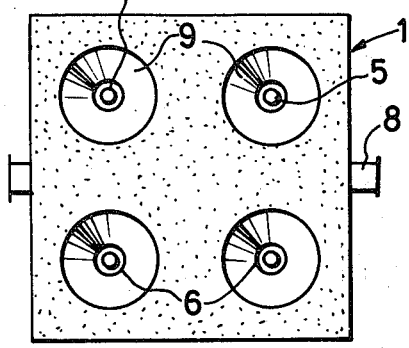
FIG. 1(B) is a cross-sectional view along the line A—A of FIG. 1(A)
Figure 2:
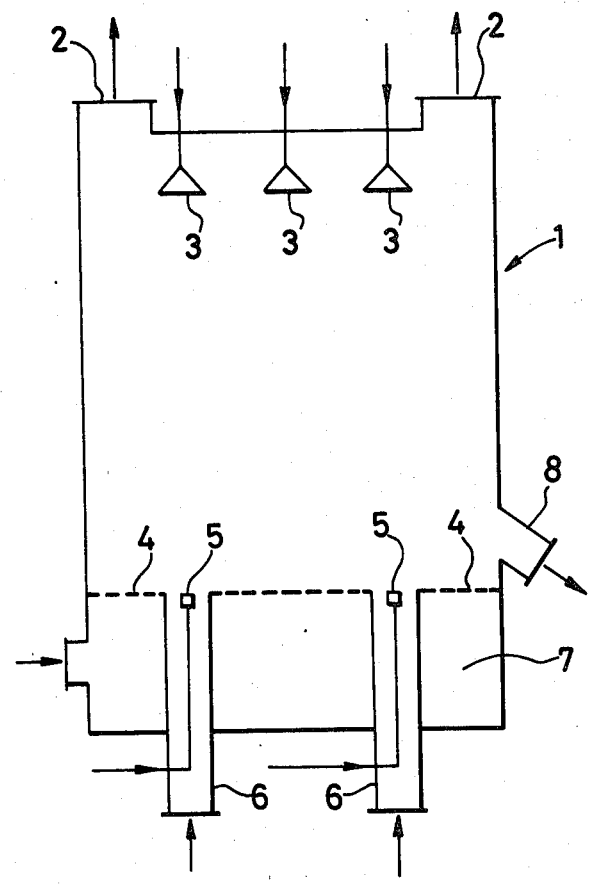
FIG. 2 is a vertical cross-sectional view showing another embodiment of the present invention apparatus where the spray nozzles are provided on the same horizontal surfaces as the perforated plate.

The preferred embodiments of the present invention will now be explained reference being made to FIGS. 1 and 2. There are provided exhaust outlets 2 at the top of the cylindrical member 1. There are similarly provided melt supply vessel 3 which have a plurality of nozzles to spray the solution downwardly or let the drops fall by gravity. There is provided a perforated plate 4 at the bottom of the cylindrical member 1 defining the lower limit or floor base of the fluidized bed to be formed thereupon.

Positioned below the surface of the perforated plate 4 are provided spray nozzles 5, the nozzles spraying the melt upwardly as fine grains. In the embodiment shown in FIG. 1, the spray nozzles are provided at the bottom of the inverted truncated cone shaped vessel 9 opening on the plane of the perforated plate 4. The embodiment shown in FIG. 2 provides the spray nozzles 5 on the same plane as the surface of the perforated plate 4. There is provided a pipe 6 beneath the respective spray nozzles for supplying the air current which maintains a uniform contact between the fine spray from nozzles 5 and the granules to be coated and enlarged. There is further provided a chamber 7 for supplying the air current for forming the fluidized bed beneath the perforated plate. At the lower portion of the cylindrical member 1 there is provided a discharge pipe 8 for granule products.

The functions of the apparatus shown in the drawings will now be explained. There is formed a fluidized bed of granules to be coated and enlarged on the perforated plate by the air current which passes upwardly from the air supply chamber 7. The granules inside the fluidized bed successively enters the spouted bed formed by the air current supplied through the pipes 6, and become enlarged as the fine grains sprayed through the spray nozzles 5 become adhered thereon. The air current, which is flowing from the pipes 6 and the air supply chamber 7 to form the spouted bed and the fluidized bed, rises inside the cylindrical member 1, contacts the droplets introduced from the nozzles of the melt supply vessel 3 and falling therefrom to cool or dry them, and finally discharges outside the apparatus from the exhaust outlets 2.

The droplets falling inside the cylindrical member 1 become solidified, and mix into the fluidized bed. The granules which these solidified drops form are abundant and their diameter and shape are substantially uniform, and remarkably improve the efficiency of the grain growth inside the spouted bed.

The granules inside the fluidized bed eventually overflow and are discharged from the apparatus, through exhaust pipe 8.

The apparatus according to the present invention will now be explained by way of example.

EXAMPLE

In the example, urea granules of 3 to 5 mm diameter are manufactured.

The vertical distance from the nozzle plate beneath the melt supply means 3 inside the cylindrical member 1 to the fluidization base floor below is 40 m, and the spouted beds are arranged at four points on the perforated plate, while the vessels of inverted truncated conical shape positioned around the respective jet streams have an opening of 0.9 m diameter on the perforated plate.

The distance between centers of the adjacent spouted beds is 1.4 m. The 35° C. air is supplied to the supply chamber 7 at the rate of 60,000 Nm³/hour, and the 40° C. air is supplied from the four pipes 6 at the rate of 40,000 Nm³/hour, to form a fluidized bed of urea granules having a depth of 0.1 m on the perforated plate. The molten urea of 138° C. is supplied from the melt supply vessel 3 at the flow rate of 17.5 t/hour, and is also supplied from the four spray nozzles 4 at 7.5 t/hour. The 111° C. air is discharged from the exhaust outlet 2 at the rate of 100,000 Nm³/hour to be introduced into a fine grain collector (not shown). The urea granules of 3 to 5 mm diameter of 60° C. are discharged at 25 t/hour from the discharge pipe 8.

Although the example shown relates to urea granules, the present invention may be applicable to granulation of other substances. The present invention is also useful for coating or covering the surface of granules with other substances.

The advantages of the present invention may therefore be summarized as follows:

(1) Large diameter granules are mass produced efficiently.

(2) The quantity of material retained in the various stages in the granulation apparatus and affiliated facilities is small.

(3) Product granules tend remarkably toward a true spherical shape.

(4) The allowable water content in the melt used as the raw material may be high.

(5) The minor improvement to the lower portion of the conventional prilling tower enables mass production of large diameter granules.

What is claimed is:

1. A process for producing substantially spherical granules having a diameter larger than about 2 mm, which comprises the steps of:
    (a) dropping as liquid droplets the melt of a substance solidifiable by cooling or drying through a cooling zone having a sufficient height to solidify said liquid droplets, said melt containing up to 40% by weight of water;
    (b) countercurrently contacting said liquid droplets with a gas stream for cooling or drying, thereby forming solidified prills having diameter smaller than about 2 mm;
    (c) fluidizing said prills with a gas stream at the bottom of said cooling zone to form a fluidized bed;
    (d) spraying as fine liquid grains the melt of substance solidifiable by cooling or drying upwardly into said fluidized bed along with a gas stream to form a sprouted bed of said prills in said fluidized bed, while coating and enlarging said prills with said liquid grains, thereby forming granules having a diameter of up to 5 times greater than the diameter of said prills, the weight ratio of the melt dropped as liquid droplets to the melt sprayed as fine liquid grains ranging from 1:4 to 4:1, and
    (e) discharging said granules from said fluidized bed.

2. A process as claimed in claim 1, wherein said melt dropped as liquid droplets and said melt sprayed as fine liquid grains are both urea and said granules are urea granules having diameters of 3-5 mm.

3. A process as claimed in claim 1, wherein said prills have a diameter between 1 and 2 mm.

4. A process as claimed in claim 1 wherein at least one of said melts is a melt of a fertilizer substance.

* * * * *